UNITED STATES PATENT OFFICE.

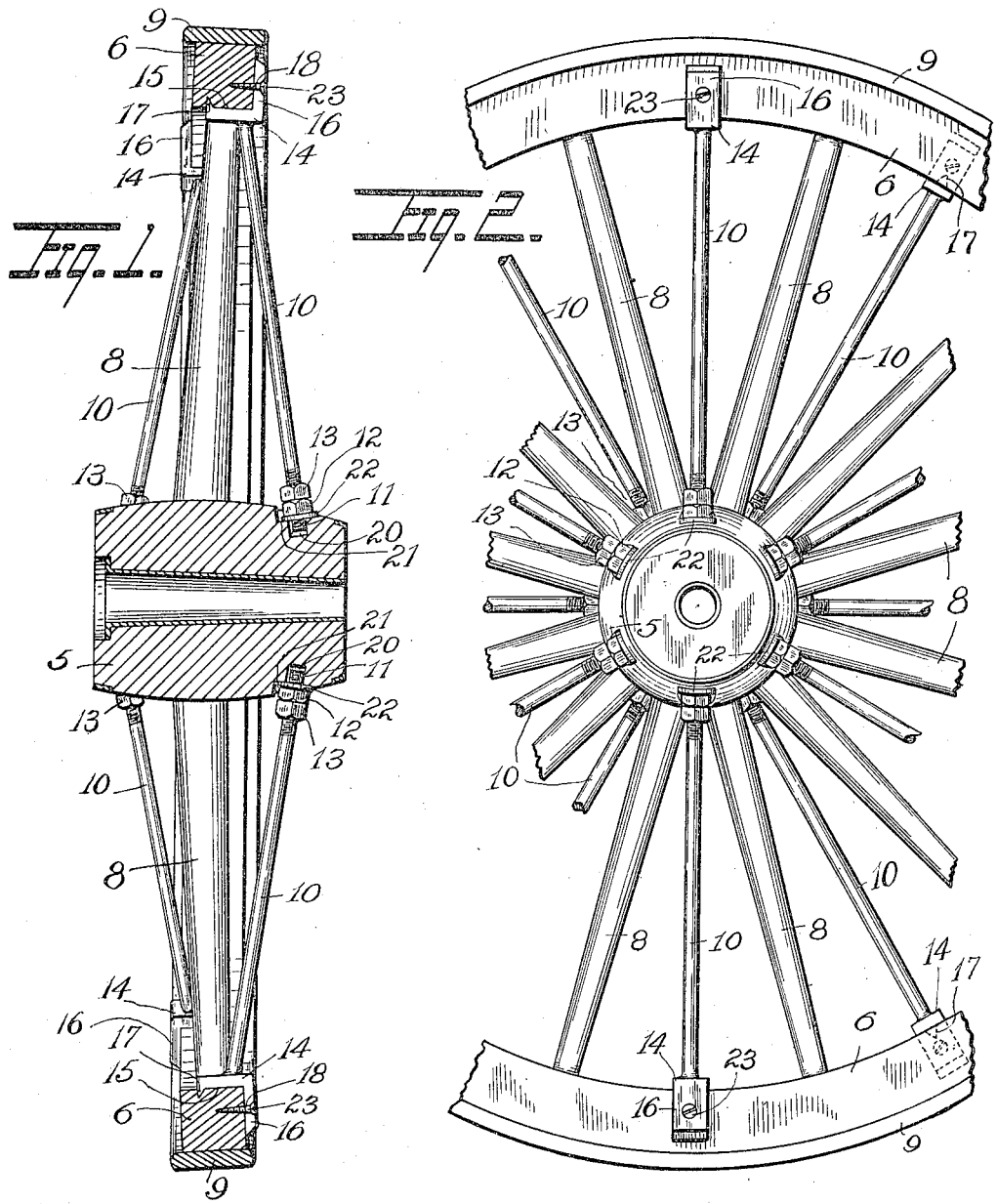

ELMER E. PALM, OF MOUNT PENN, PENNSYLVANIA.

WAGON-WHEEL.

1,320,491.   Specification of Letters Patent.   Patented Nov. 4, 1919.

Application filed May 2, 1919. Serial No. 294,297.

*To all whom it may concern:*

Be it known that I, ELMER E. PALM, a citizen of the United States, residing at Mount Penn, in the county of Berks and State of Pennsylvania, have invented certain new and useful Improvements in Wagon-Wheels, of which the following is a specification.

My invention relates particularly to wheels having tired rims with hub-connecting spokes, and my object is to provide very simple and easily applied bracing means thereto to enable the improved structure to withstand abnormal strains to which it is apt to be subjected in operating under heavy loads on uneven ground. The invention is fully described in connection with the accompanying drawing and specifically defined in the subjoined claim.

Figure 1 is a vertical section, and Fig. 2 a partial side elevation of a wheel embodying my invention.

The drawing indicates an ordinary wagon wheel comprising a wooden hub 5, rim 6, spokes 8, and metal tire 9 shrunk thereon to give the usual disk, or outward projection of the rim; a particular advantage incident to my improvement being its ready applicability to such usual wheel construction, without involving changes or additions to any of the main structural parts, and with a minimum of ordinary labor.

It is well known that the wheel rim is commonly subjected to strains harmful to the ordinary structure indicated, and bracing means have heretofore been devised involving special hub or rim construction or appliances for attachment thereof. My present improvement provides for the use of simple strut devices, simply applied so as to coöperate with the usual wheel elements in producing an effectively braced structure for lateral strains while at the same time furnishing constant support for the rim portions between the spokes.

To this end I employ as bracing devices a series of struts 10 adapted to be readily applied to the ordinary wheel structure described to serve solely as compression members between the wheel rim and the outer portions of the hub.

This bracing device 10 consists, as shown, of a metal strut rod having a screw-threaded hub-engaging end portion 11, provided with a nut 12 thereon which forms, in connection with a coöperating jam nut 13, an adjustable hub-seating flange; and a rim-supporting opposite end portion 14, forming a flanged head with a rim seat 15 arranged at a slightly obtuse angle to the strut rod corresponding with the determined inclination of the strut, and a right-angled flange 16 adapted to contact with the outer face of the wheel rim. As shown the seat 15 is provided with a dowel extension 17, and the flange 16 with a screw-aperture 18, for attachment to the wheel rim.

The application of these simple bracing devices 10 to the ordinary wooden wheel structure indicated, is very simply effected without involving the use of any other appliance to the wheel structure. A series of them is employed, located midway between adjacent spokes throughout the wheel structure, with an outward incline from the engaged wheel-rim to the outer portion of the wheel hub. The seating engagement of each strut device with the hub is provided for by merely boring a series of inclined strut-engaging recesses 20 in the latter, of a diameter adapted to receive a portion of the screw-threaded strut end 11 which extends beyond the adjustable seating-flange nuts 12, 13; and with a seating rim 21 squared to the incline of the strut device 10 and supporting a washer 22 against which said flange-forming nuts 12, 13 are adjustably seated. In applying each strut device, its screw-threaded end 11 is first inserted in a hub recess 20 with the flange-forming nuts 12, 13 sufficiently withdrawn, and the rim-supporting head 14 is then properly placed and the nut 12 tightly seated upon the interposed washer 22 to exert a compression strain upon the strut device sufficient to provide a rigid support for the rim between the hub spokes. The strut-head 14 being firmly seated against the wheel rim and also secured thereto by a flange screw 23 as indicated, and the jam nut 13 being tightly set, the application of my invention is completed; any subsequent readjustment however being obviously effected with ease if required.

The full effect of the simple strut arrangement set forth is made evident by consideration of the fact that the stress which is put upon my struts 10 by adjustment of the hub-abutting nut 12 thereof, is exerted against the tension under which the tire 9 is applied to the wheel rim; which tire tension is also normally effective in resisting inwardly lateral strains upon the rim; so that the normal stressing of the struts 10 imparts great rigidity to the thus improved structure. The normal stress provided upon the struts furnishes constant required support to the rim portions between the spokes; outward lateral strains upon the rim merely increasing this stress; and the spoke-loosening effect of the ordinary yielding under frequently reversed lateral strains upon the rim is prevented. By alternately applying the struts to the outer and inner faces of the wheel rim, and inclining them respectively toward the outer and inner ends of the hub, as indicated in the drawing, any lateral strains upon the rim and spokes will be directly resisted by compression of the nearest struts.

The easy and economical application of my invention to old wheels is a great advantage.

What I claim is:

The combination with a wheel having connecting spokes between the rim and hub, of a series of inclined rim-supporting struts each having a flanged-head outer end conforming to and rigidly secured against the outer face and inner periphery of said rim, and a screw-threaded inner end provided with compression-adjusting nuts, said hub being provided with a series of inclined recesses in which the extremities of said screw-threaded strut ends are respectively engaged, and each recess having a squared seating rim for the adjusted nuts.

In testimony whereof I affix my signature.

ELMER E. PALM.

Copies of this patent may be obtained for five cents each, by addressing the "Commissioner of Patents, Washington, D. C."